(12) United States Patent
Tseng

(10) Patent No.: US 9,128,604 B2
(45) Date of Patent: Sep. 8, 2015

(54) SYSTEMS AND METHODS FOR POSITIONING A CURSOR

(75) Inventor: Te-Pei Tseng, Taoyuan County (TW)

(73) Assignee: HTC CORPORATION, Taoyuan, Taoyuan County (TW)

( * ) Notice: Subject to any disclaimer, the term of this patent is extended or adjusted under 35 U.S.C. 154(b) by 388 days.

(21) Appl. No.: 13/236,218

(22) Filed: Sep. 19, 2011

(65) Prior Publication Data

US 2013/0074012 A1 Mar. 21, 2013

(51) Int. Cl.
*G06F 3/048* (2013.01)
*G06F 3/0488* (2013.01)
*G06F 17/24* (2006.01)

(52) U.S. Cl.
CPC ............ *G06F 3/04883* (2013.01); *G06F 3/048* (2013.01); *G06F 17/24* (2013.01)

(58) Field of Classification Search
CPC ................................. G06F 3/041; G06F 3/048
USPC .................................................. 715/858, 856
See application file for complete search history.

(56) References Cited

U.S. PATENT DOCUMENTS

| | | | | |
|---|---|---|---|---|
| 2006/0095867 | A1* | 5/2006 | Rogalski et al. | 715/858 |
| 2008/0259040 | A1* | 10/2008 | Ording et al. | 345/173 |
| 2011/0320978 | A1* | 12/2011 | Horodezky et al. | 715/823 |

* cited by examiner

*Primary Examiner* — Andrea Leggett
(74) *Attorney, Agent, or Firm* — McClure, Qualey & Rodack, LLP

(57) ABSTRACT

Systems and methods are described for repositioning a cursor. One embodiment is a method implemented in a mobile device for repositioning a cursor. The method comprises displaying a user interface and receiving, by the mobile device via the user interface, an initial tap on the mobile device by a user. Based on the initial tap, an anchor is invoked for repositioning a cursor, wherein the location of the anchor corresponds to a location of the cursor. The method further comprises receiving an additional tap after the initial tap. Based on a location of the additional tap with respect to the anchor, the cursor is repositioned according to the additional tap. The method further comprises updating the user interface to reflect repositioning of the cursor.

12 Claims, 9 Drawing Sheets

SYSTEMS AND METHODS FOR POSITIONING A CURSOR

BACKGROUND

With the rapid development in communications technology, mobile devices have become an integral part of many people's lives given the portability, the convenient access to the Internet, and the growing number of applications available on mobile devices. Today, individuals can perform a wide range of functions such as e-mail communications, web surfing, electronic commerce, etc. via mobile devices. Many mobile devices today are equipped with touchscreens, which individuals use to enter text. While mobile devices typically provide means for navigating through text, various perceived shortcomings exist with existing mechanisms.

SUMMARY

Briefly described, one embodiment, among others, is a method implemented in a mobile device for repositioning a cursor. The method comprises displaying a user interface and receiving, by the mobile device via the user interface, an initial tap on the mobile device by a user. Based on the initial tap, an anchor is invoked for repositioning a cursor, the location of the anchor corresponding to a location of the cursor. The method further comprises receiving an additional tap after the initial tap. Based on a location of the additional tap with respect to the anchor, the cursor is repositioned according to the additional tap. The method further comprises updating the user interface to reflect repositioning of the cursor.

Another embodiment is a system for repositioning a cursor, comprising: a touchscreen display for displaying a user interface and a tap detector configured to receive taps on the touchscreen from a user, the tap detector further configured to track a number of taps, the tap detector further configured to track a location of the taps. The system further comprises a cursor positioner configured to invoke an anchor for repositioning a cursor based on an first tap, wherein the location of the anchor corresponds to a location of the cursor, wherein the cursor positioner is further configured to reposition the cursor based on a second tap and updated the user interface to reflect repositioning of the cursor.

Another embodiment is a non-transitory computer-readable medium embodying a program executable in a computing device, the program comprising logic for displaying a user interface and logic for receiving, via the user interface, an initial tap on the computing device by a user. The program further comprises logic for invoking an anchor for repositioning a cursor based on the initial tap, wherein the location of the anchor corresponds to a location of the cursor. The program further comprises logic for receiving an additional tap after the initial tap, logic for repositioning the cursor according to the additional tap based on a location of the additional tap with respect to the anchor, and logic for updating the user interface to reflect repositioning of the cursor.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
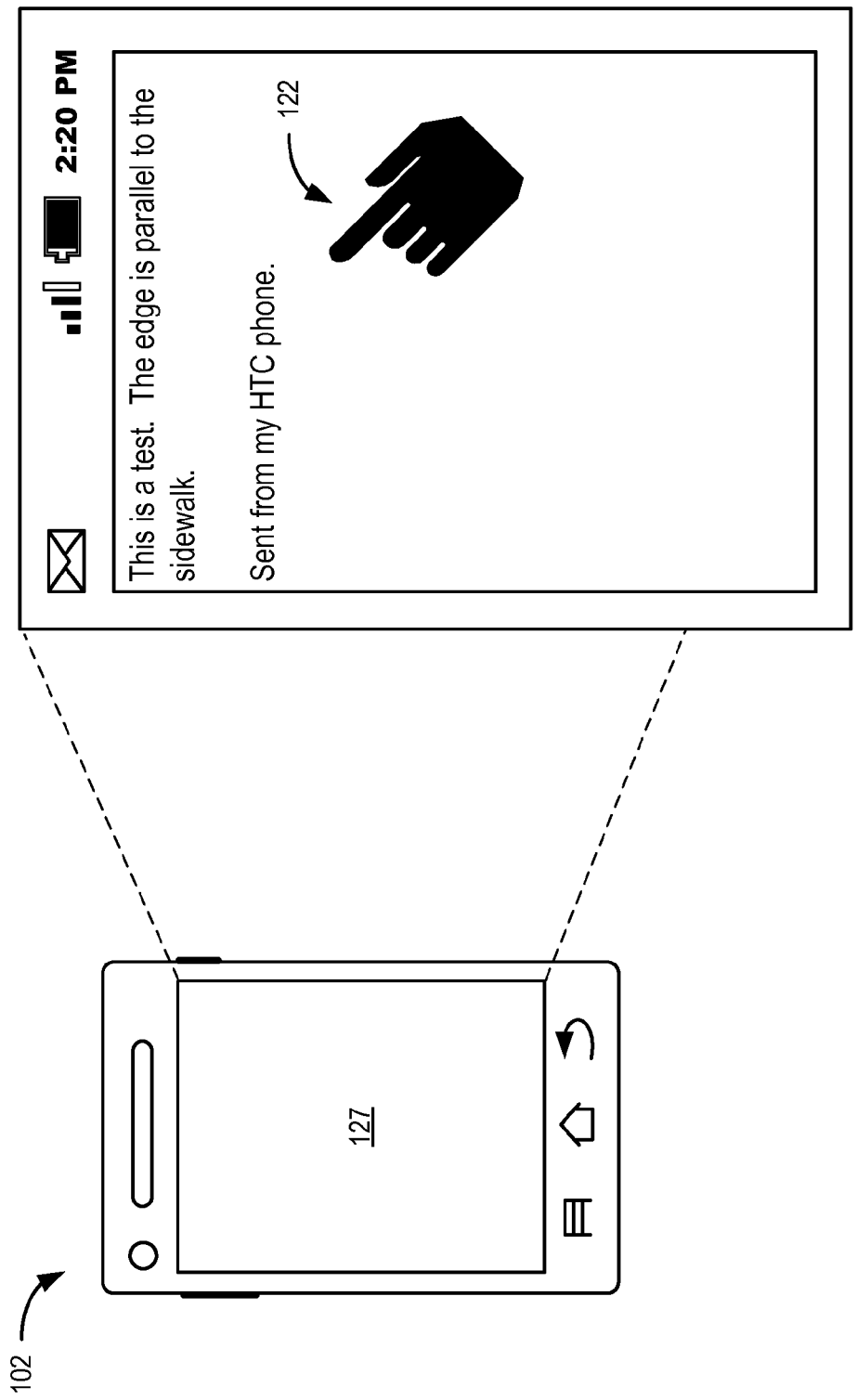
FIG. 1 illustrates a touchscreen interface on a mobile device.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

As discussed above, mobile devices have become an integral part of many people's lives given the portability, the convenient access to the Internet, and the growing number of applications available on mobile devices. Today, individuals can perform such functions as e-mail communication, surfing the Internet, among other functions on their mobile devices. In this regard, a need exists for providing an efficient and accurate means for navigating through displays on a mobile device.

Figure 2:
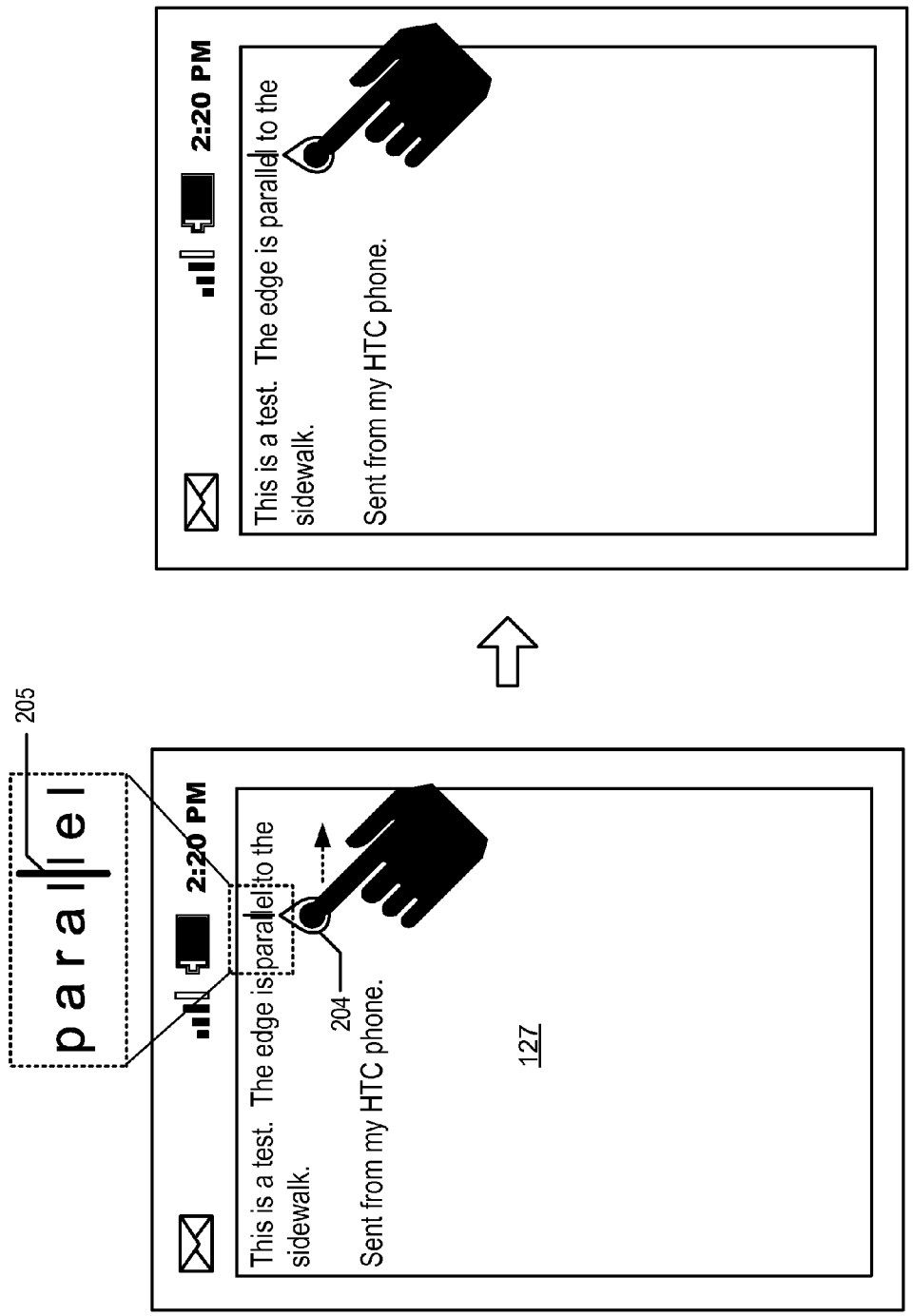
FIG. 2 illustrates the repositioning of an anchor or handle based on a dragging motion.

FIG. 1 illustrates a touchscreen display 127 on a mobile device 102. Shown on the display 127 is an example message (e.g., an e-mail or text message) entered or received by a user of the mobile device 102. In some cases, the user may wish to select or highlight one or more characters in the display 127. Typically, the user uses his hand 122 or stylus (not shown) to accomplish this. In some cases, an anchor or other visual indicator may be invoked when the user, for example, taps the display 127 with his finger. FIG. 2 illustrates the repositioning of an anchor or handle based on a dragging motion. For some implementations, a user taps the display 127 once to invoke the anchor or handle 204 and drags the anchor 204 to reposition the cursor 205. In cases, however, it may be difficult to simply drag the anchor 204, particularly if the user wants to move over one character and the characters are closely spaced together. Other factors such as the font and font size of the characters on the display 127 may also make it more difficult to navigate across characters. For example, repositioning a cursor between two "l"s can be difficult when dealing with a small font size. In some cases, the user may overshoot and end up moving more than one character over, as illustrated on the right in FIG. 2, where the user moves the cursor over two characters rather than just one character.

Various embodiments are described for repositioning a cursor on a display of a mobile device. One embodiment, among others, is a multi-tap mechanism that comprises displaying a user interface and receiving, by the mobile device via the user interface, an initial tap on the mobile device by a user. Based on the initial tap, an anchor or other icon/visual indicator is displayed for navigating the cursor where the location of the anchor corresponds to the location of the cursor. The mobile device receives an additional tap after the initial tap and based on a location of the additional tap with respect to the anchor, the cursor is repositioned according to the additional tap. The user interface is updated to reflect repositioning of the cursor. The embodiments described provide users with an efficient and accurate means of positioning a cursor in a user interface.

Figure 3:
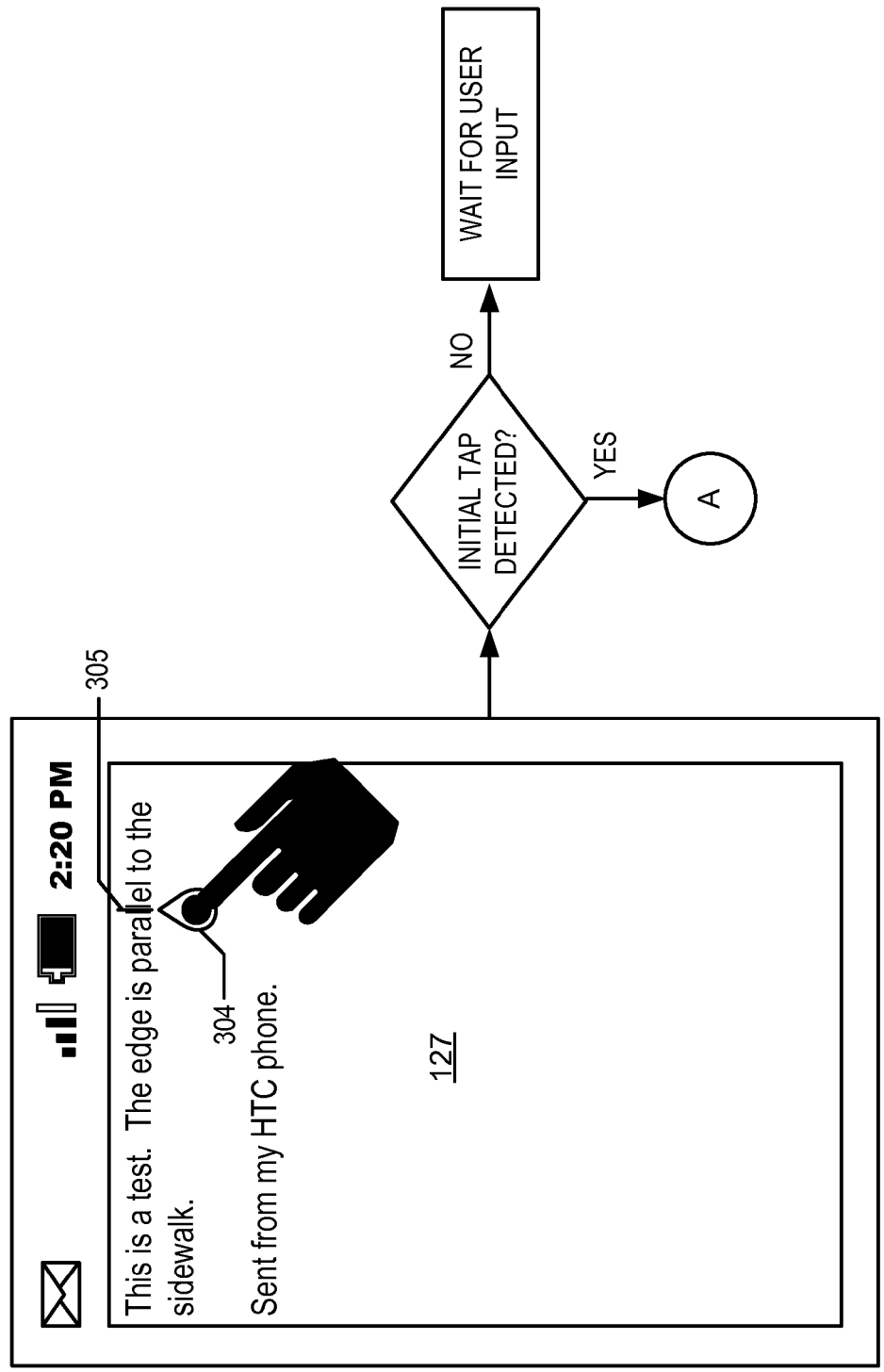
FIGS. 3-4 illustrate an embodiment for the repositioning of an anchor or handle based on a multi-tap implementation.
Figure 4:
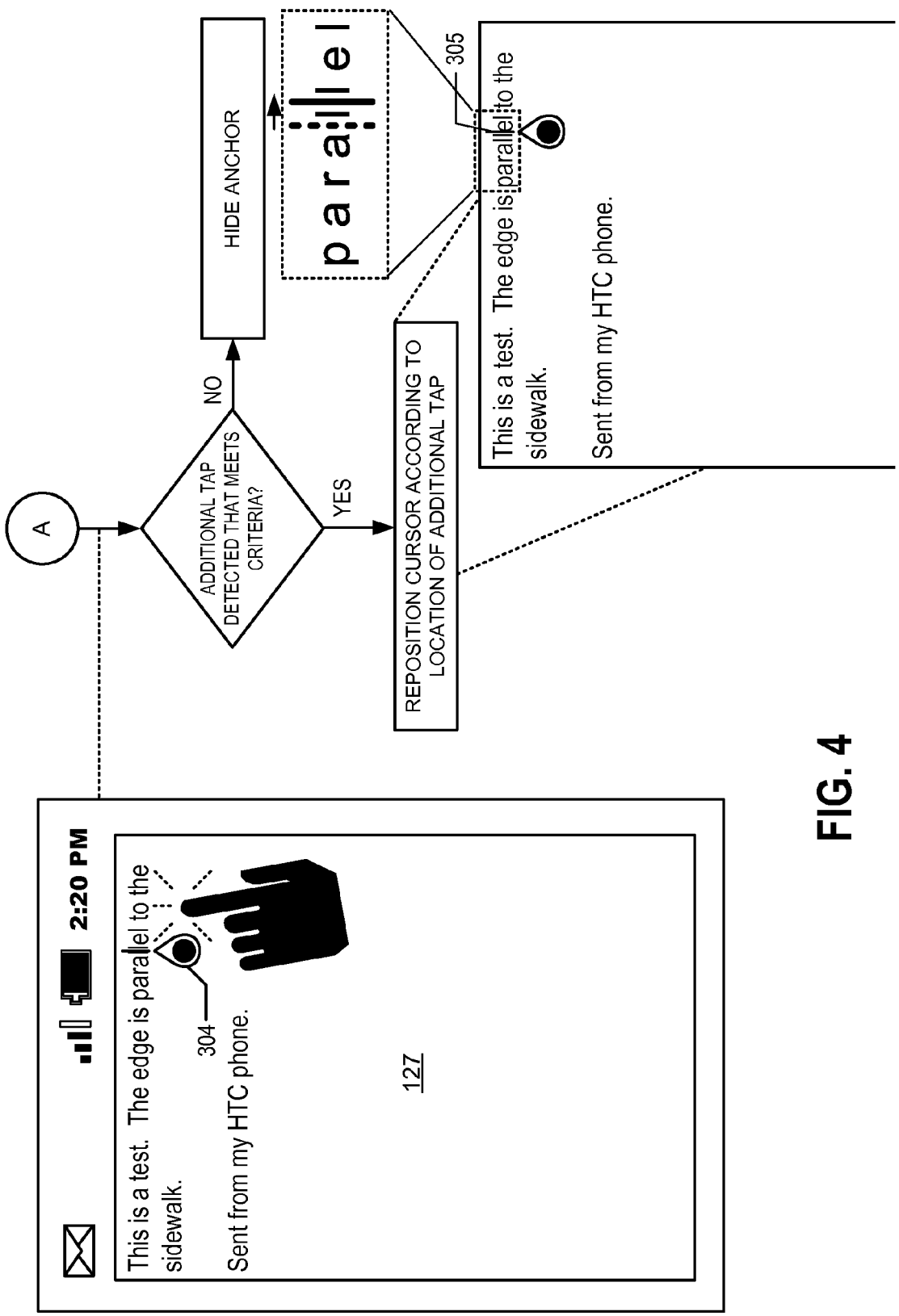

To further illustrate various aspects, reference is made to FIGS. 3 and 4, which illustrate an embodiment for the repositioning of an anchor or handle based on a multi-tap implementation. FIG. 3 depicts a user interface in which a user of the mobile device repositions a cursor 305 on a display 127. In accordance with various embodiments, the mobile device monitors the touchscreen interface to determine whether an initial tap is made by the user. The mobile device may be configured to identify taps according to the length of contact by the user's hand or stylus. For example, the mobile device may be configured to differentiate between a tap versus a long press, which may invoke another command/function on the mobile device.

As shown in FIG. 3, if no initial tap is detected, then the mobile device continues to wait for user input. If, however, an initial tap is detected, then a determination is made on whether an additional (follow-up) tap is made that meets certain criteria, as illustrated in FIG. 4. As will be described in more detail later, one criteria may include a requirement that the additional tap be made within a certain proximity of the location of the anchor, otherwise, the criteria is not met. In accordance with some embodiments, the additional tap must not only be within a certain proximity of the location of the anchor, but must also be either directly to the left or right of the anchor, as illustrated in FIG. 4. For some embodiments, an additional criteria must be met where the additional tap must be made within a predetermined window of time of when the initial tap was made, otherwise, a time-out condition is reached. Note that for some embodiments, the predetermined window of time may be a configurable parameter specified by the user. As further illustrated in FIG. 4, if the criteria is not met (where the criteria may comprise one or both conditions described above), then the anchor is hidden, and the process resets where an initial tap is required to re-invoke the anchor 304.

If the criteria is met, then the cursor 305 and accompanying anchor 304 are repositioned according to the location of the additional tap. Suppose, for example, that the user performs a tap to the right of the anchor 304 in close proximity to the anchor 304, based on this, the cursor 305 and anchor 304 are repositioned to the right of the last location. For exemplary embodiments, the cursor 305 and anchor 304 are moved one character at a time such that each tap corresponds to a single character.

Figure 5:
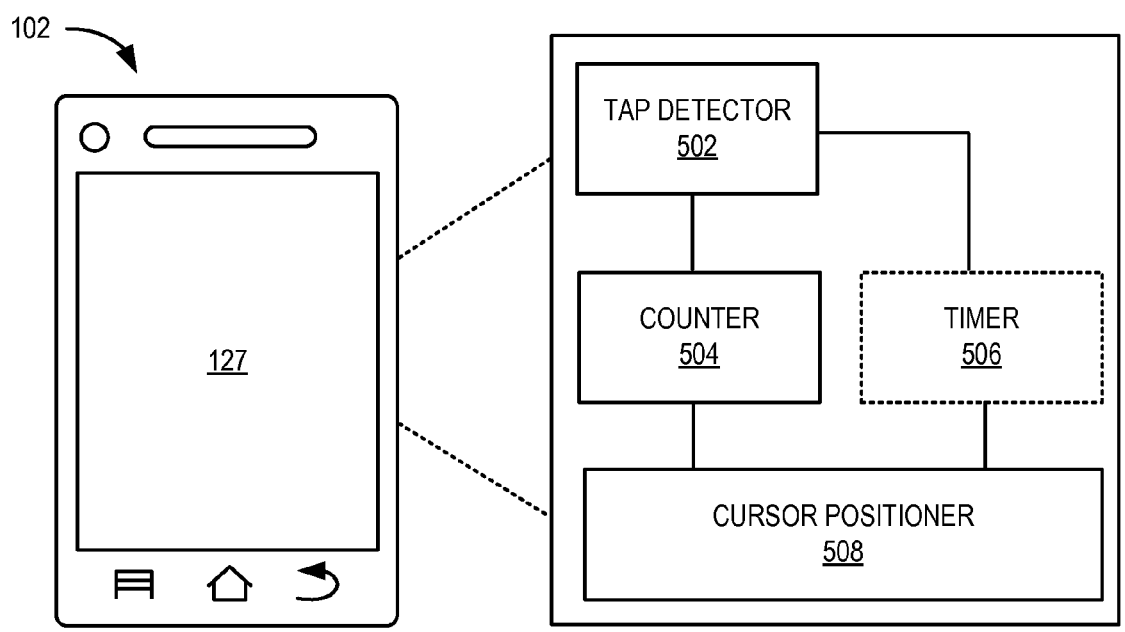
FIG. 5 is a block diagram of a mobile device configured to implement the cursor navigation feature in accordance with various embodiments.

Having described the basic concept of the multi-tap mechanism for repositioning a cursor, reference is made to FIG. 5, which is a block diagram of a mobile device 102 configured to implement the cursor positioner feature in accordance with various embodiments. As describe earlier, the mobile device 102 comprises a display 127 such as a touchscreen display configured to receive inputs from a user. The mobile device 102 further comprises a tap detector 502 configured to differentiate between different types of contact by a user. For example, the tap detector 502 may be configured to differentiate between a single tap, a long press, and a casual swipe by the user. The tap detector 502 is also configured to determine whether a subsequent tap after the initial tap is in close proximity to the anchor.

The mobile device 102 further comprises a counter 504 configured to track the number of taps made by a user. As described earlier, an initial tap invokes the anchor/visual indicator, and the occurrence of any additional taps causes the cursor to be moved. For some embodiments, the mobile device 102 may also comprise a timer 506 configured to monitor the length of time that transpires between an initial tap and any subsequent taps. If the length of time is too long, then a time-out condition arises, and the counter 504 is reset. Based on the count and in some embodiments, the time transpired between taps, the cursor positioner 508 repositions the cursor.

Figure 6:
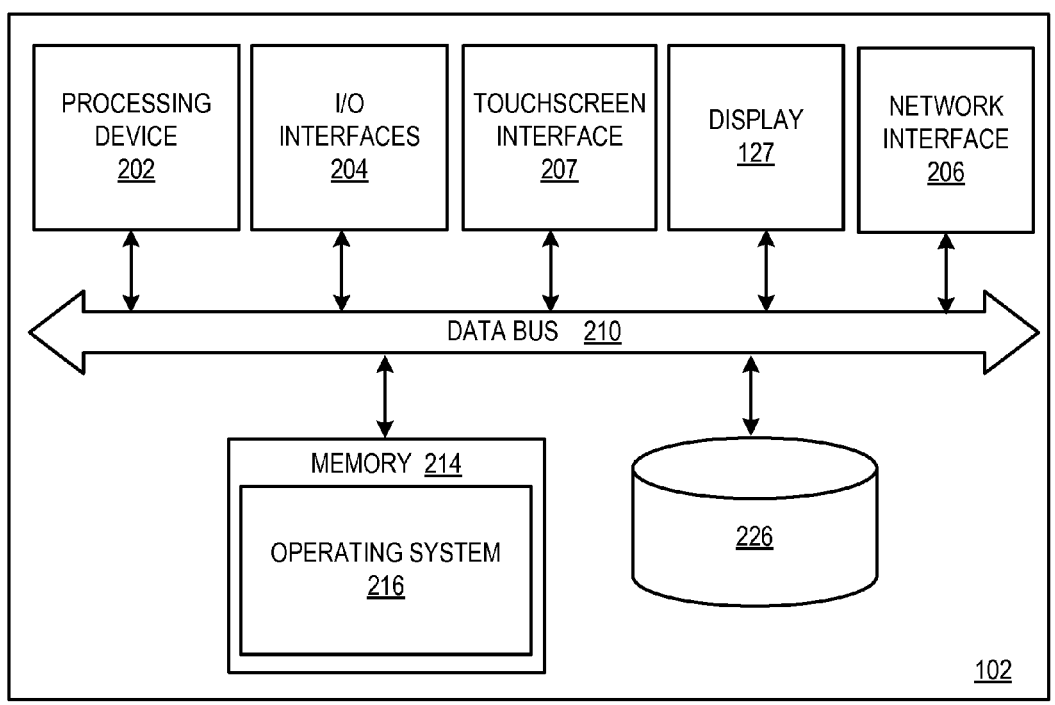
FIG. 6 illustrates an embodiment of the mobile device in FIG. 7.

FIG. 6 illustrates an embodiment of the mobile device 102 in FIG. 5. The mobile device 102 may be embodied as a mobile device but may also be embodied in any one of a wide variety of wired and/or wireless computing devices. As shown in FIG. 6, the mobile device 102 comprises memory 214, a processing device 202, a number of input/output interfaces 204, a network interface 206, a display 127, a touchscreen interface 207, and mass storage 226, wherein each of these devices are connected across a local data bus 210. Those skilled in the art will appreciate that the mobile device 102 includes other devices not shown for purposes of brevity.

The processing device 202 may include any custom made or commercially available processor, a central processing unit (CPU) or an auxiliary processor among several processors associated with the mobile device 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 can include any one of a combination of volatile memory elements (e.g., random-access memory (RAM, such as DRAM, and SRAM, etc.)) and nonvolatile memory elements. The memory 214 typically comprises a native operating system 216, one or more native applications, emulation systems, or emulated applications for any of a variety of operating systems and/or emulated hardware platforms, emulated operating systems, etc. For example, the applications may include application specific software which may comprise some or all the components of the mobile device 102 depicted in FIG. 6. In accordance with such embodiments, the components are stored in memory 214 and executed by the processing device 202.

The touchscreen interface 207 is configured to receive input from a user via a display 127 in the form of taps and/or finger gestures. One of ordinary skill in the art will appreciate that the memory 214 can, and typically will, comprise other components which have been omitted for purposes of brevity. Note that in the context of this disclosure, a non-transitory computer-readable medium stores programs for use by or in connection with an instruction execution system, apparatus, or device. With further reference to FIG. 6, network interface device 206 comprises various components used to transmit and/or receive data over a networked environment.

Figure 7:
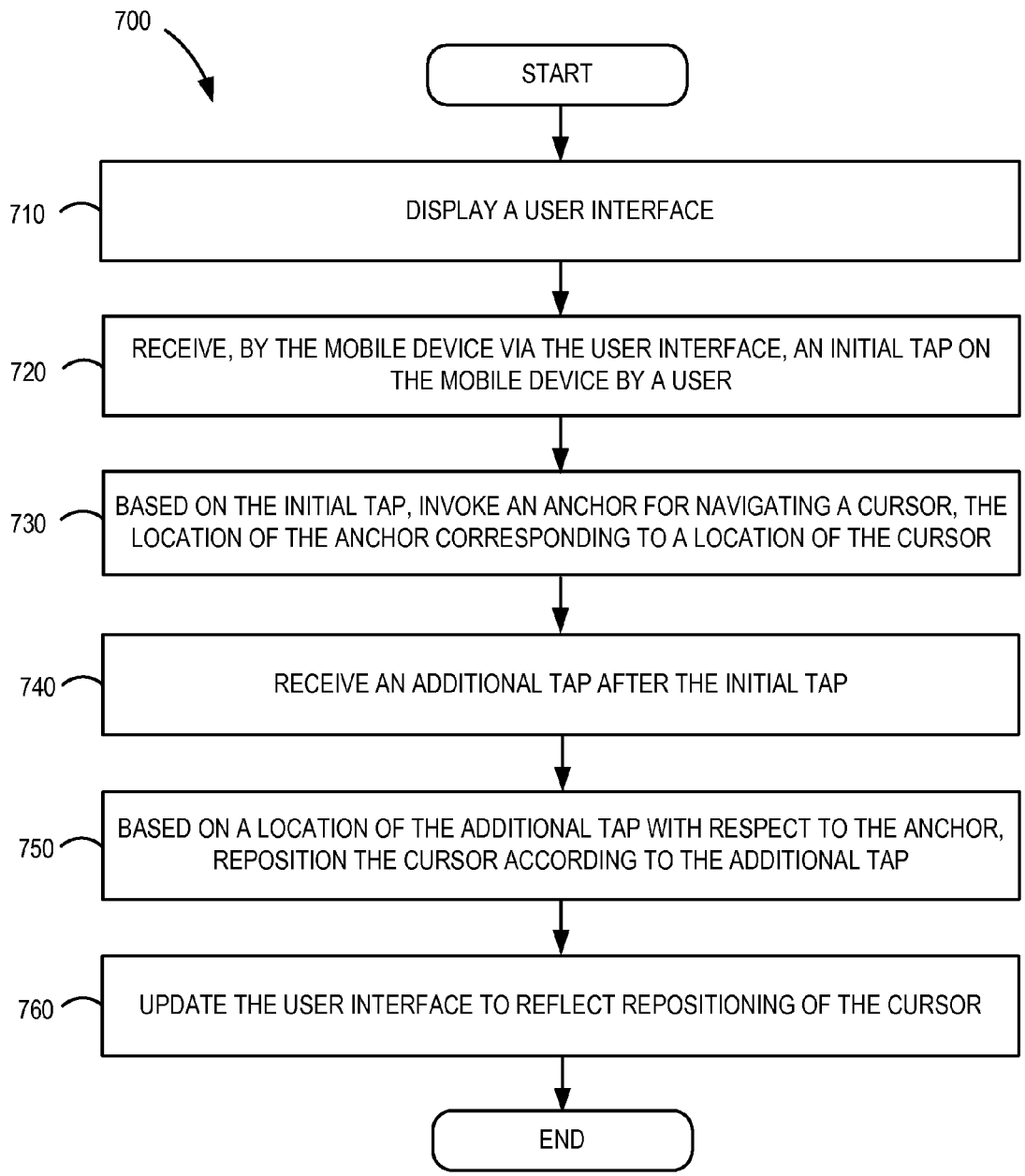
FIG. 7 depicts a top-level flow diagram for an embodiment for repositioning a cursor implemented in the mobile device of FIG. 5.

Reference is now made to FIG. 7, which is a flowchart 700 of a method implemented in a mobile device for repositioning a cursor. If embodied in software, each block depicted in FIG. 7 represents a module, segment, or portion of code that comprises program instructions stored on a non-transitory computer readable medium to implement the specified logical function(s). In this regard, the program instructions may be embodied in the form of source code that comprises statements written in a programming language or machine code that comprises numerical instructions recognizable by a suitable execution system such as a processor in a computer system or other system such as the mobile device shown in FIGS. 5-6. The machine code may be converted from the source code, etc. If embodied in hardware, each block may represent a circuit or a number of interconnected circuits to implement the specified logical function(s).

Although the flowchart 700 of FIG. 7 shows a specific order of execution, it is understood that the order of execution may differ from that which is depicted. Beginning in block 710, a user interface is displayed. In block 720, the mobile device receives, via the user interface, an initial tap on the mobile device by a user. Based on the initial tap, an anchor is invoked for repositioning a cursor, the location of the anchor corresponding to a location of the cursor (block 730). In block 740, an additional tap is received after the initial tap. Based on a location of the additional tap with respect to the anchor, the cursor is repositioned according to the additional tap (block 750). In block 760, the user interface is updated to reflect repositioning of the cursor.

Figure 8:
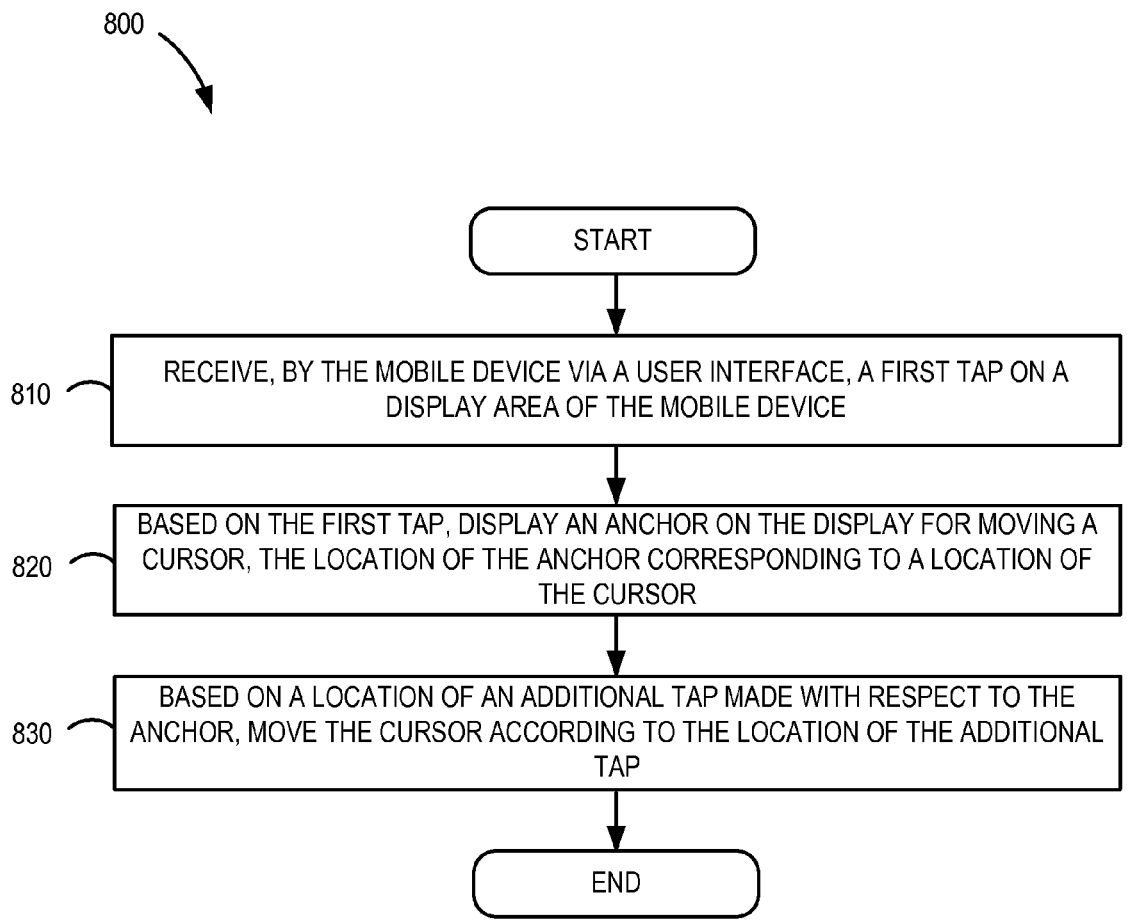
FIG. 8 depicts a top-level flow diagram for an alternative embodiment for repositioning a cursor implemented in the mobile device of FIG. 5.

FIG. 8 depicts a top-level flow diagram for an alternative embodiment for repositioning a cursor implemented in the mobile device of FIG. 5. Again, if embodied in software, each block depicted in FIG. 8 represents a module, segment, or portion of code that comprises program instructions stored on a non-transitory computer readable medium to implement the specified logical function(s). In this regard, the program instructions may be embodied in the form of source code that comprises statements written in a programming language or machine code that comprises numerical instructions recognizable by a suitable execution system such as a processor in a computer system or other system such as the mobile device shown in FIGS. 5-6. The machine code may be converted from the source code, etc. If embodied in hardware, each block may represent a circuit or a number of interconnected circuits to implement the specified logical function(s).

Although the flowchart 800 of FIG. 8 shows a specific order of execution, it is understood that the order of execution may differ from that which is depicted. Beginning with block 810, the mobile device receives, via a user interface, a first tap on a display area of the mobile device. Based on the first tap, an anchor is shown on the display for moving a cursor, where the location of the anchor corresponds to a location of the cursor (block 820). Based on a location of an additional tap made with respect to the anchor, the cursor is moved according to the location of the additional tap (block 830).

Figure 9:
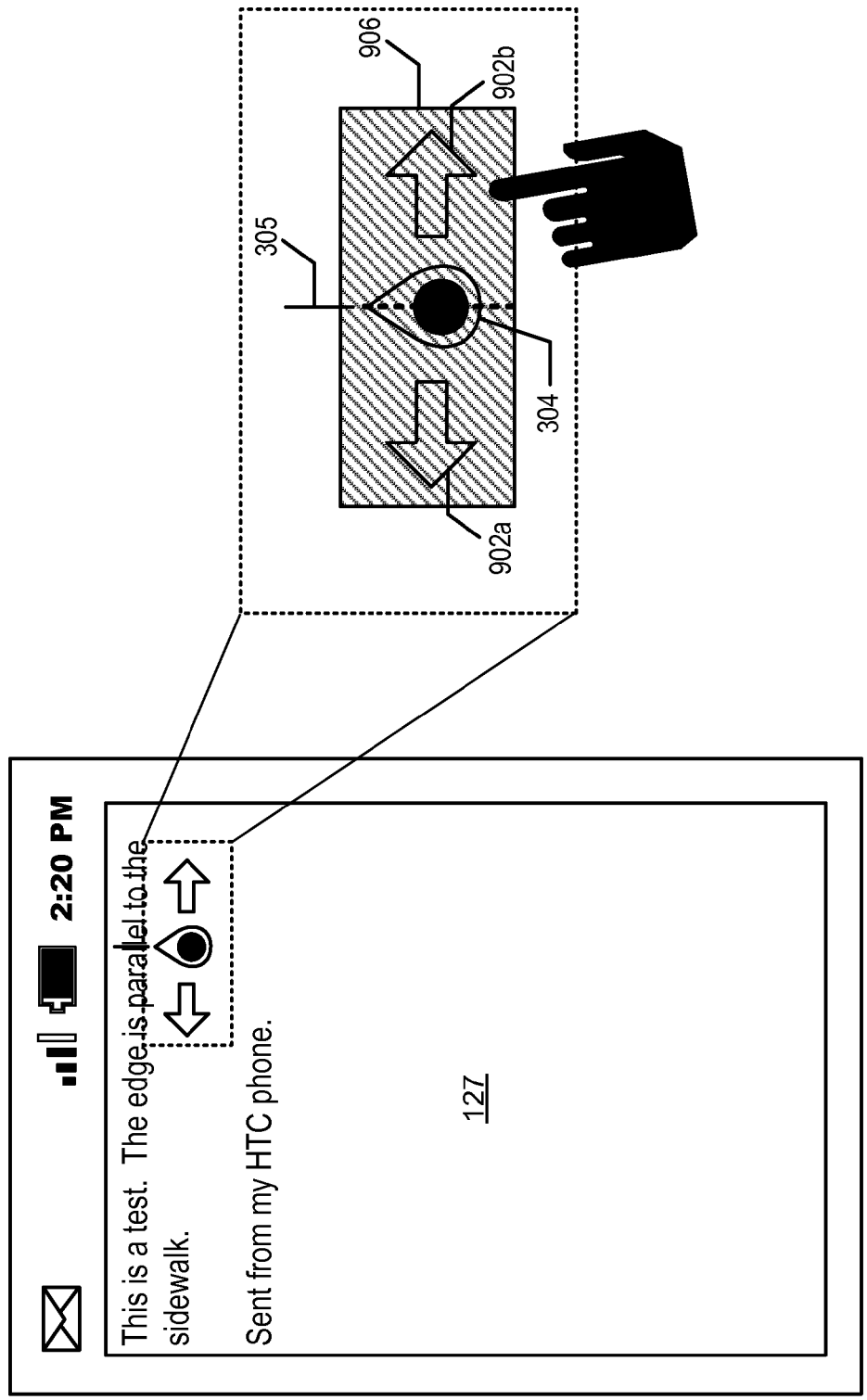
FIG. 9 depicts an alternative embodiment for the repositioning of an anchor or handle based on a multi-tap implementation, whereby navigation buttons and a target area is displayed in conjunction with the anchor.

Reference is made to FIG. 9, which depicts an alternative embodiment for the repositioning of an anchor or handle based on a multi-tap implementation, whereby navigation buttons and a target area is displayed in conjunction with the anchor. As described above, the tap detector 502 in FIG. 5 is configured to determine whether taps made subsequent to an initial tap are made within a close proximity of the anchor. Taps that are made outside a predetermined distance are simply ignored. Furthermore, subsequent taps should be made either to the right or to the left of the anchor as the cursor is generally restricted to horizontal movement.

In accordance with alternative embodiments, visual guides may be displayed in conjunction with the anchor to help guide the user in making taps that meet the proximity requirements. FIG. 9 shows a left navigation button 902a and a right navigation button 902b. If the user taps on either one of these buttons 902a, 902b, the proximity requirement is met, and the cursor is moved based on the location of the tap. For some embodiments, an additional target area 906 such as the shaded area shown in FIG. 9 may also be displayed to the user. This allows the user to perform taps anywhere in the target area 906 to reposition the cursor, thereby avoiding the need to tap exactly on one of the navigation buttons 902a, 902b. Any tap that occurs in the right half of the target area 906 will cause the cursor 305 to move to the right, and any tap that occurs in the left half of the target area 906 will cause the cursor 305 to move to the left. Note that while the cursor 305 may be moved one character at a time, the system may also be configured such that cursor more than one character at a time.

It should be emphasized that the various visual indicators shown in the figures such as the anchor and navigation buttons are merely examples and not meant to be limiting. In this regard, it should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. A method implemented in a mobile device for repositioning a cursor, comprising:
   displaying a user interface;
   receiving, by the mobile device via the user interface, an initial tap on the mobile device by a user;
   based on the initial tap, invoking an anchor for repositioning a cursor, the anchor being displayed proximate the cursor and being movable with the cursor such that orientation and spacing of the anchor relative to the cursor is maintained to visually identify a current location of the cursor;
   receiving an additional tap within a predetermined time after the initial tap;
   based on a location of the additional tap being proximally left or right of the anchor, repositioning the cursor and the anchor accordingly by a single character position; and
   updating the user interface to reflect repositioning of the cursor and the anchor such that, responsive to the additional tap being a single tap, the cursor and the anchor are repositioned by a single character position.

2. The method of claim 1, wherein repositioning the cursor comprises moving the cursor in a horizontal direction according to the location of the additional tap.

3. The method of claim 1, wherein displaying a user interface comprises displaying at least two or more characters.

4. The method of claim 1, further comprising invoking navigation buttons around the anchor.

5. The method of claim 1, wherein if the location of the additional tap is not proximal to the anchor or if the additional tap is not received within a predetermined time of the initial tap, the anchor is hidden from the display.

6. The method of claim 1, wherein a predetermined time is specified by a user of the mobile device for receiving the additional tap with respect to receiving the initial tap, wherein if the additional tap is not received within the predetermined time of the initial tap, the anchor is hidden from the display.

7. The method of claim 1, wherein the anchor, to visual identify the location of the cursor, is vertically aligned with the cursor on the user interface.

8. The method of claim 1, wherein the anchor, to visual identify the location of the cursor, exhibits an apex pointed at the cursor.

9. A system for repositioning a cursor, comprising:

a touchscreen display for displaying a user interface;

a tap detector configured to receive taps on the touchscreen, the tap detector further configured to track a number of taps, the tap detector further configured to track a location of the taps; and a cursor positioner configured to invoke an anchor for repositioning a cursor based on an first tap, wherein the anchor is displayed proximate the cursor and is movable with the cursor such that orientation and spacing of the anchor relative to the cursor is maintained to visually identify a current location of the cursor, wherein the cursor positioner is further configured to reposition the cursor and the anchor based on a second tap, received within a predetermined time after the first tap and located proximally left or right of the anchor, and update the user interface to reflect repositioning of the cursor and the anchor such that, responsive to the second tap, the cursor and the anchor are repositioned by a single character position.

10. The system of claim 9, further comprising a timer configured to determine a length of time that transpires between the first tap and the second tap.

11. The system of claim 9, wherein the cursor positioner is further configured to display a navigation button on both sides of the anchor to guide a user.

12. A non-transitory computer-readable medium embodying a program executable in a computing device, the program comprising:

logic for displaying a user interface;

logic for receiving, via the user interface, an initial tap on the computing device;

logic for invoking an anchor for repositioning a cursor based on the initial tap such that the anchor is displayed proximate the cursor, the anchor being movable with the cursor such that orientation and spacing of the anchor relative to the cursor is maintained to visually identify a current location of the cursor;

logic for receiving an additional tap within a predetermined time after the initial tap;

logic for repositioning the cursor and the anchor according to the additional tap based on a location of the additional tap being proximally left or right of the anchor; and logic for updating the user interface to reflect repositioning of the cursor and the anchor such that, responsive to the additional tap being a single tap, the cursor and the anchor are repositioned by a single character position.

* * * * *